May 30, 1961 D. FIRTH 2,986,416
SHAFT BUSHING
Original Filed Sept. 23, 1953
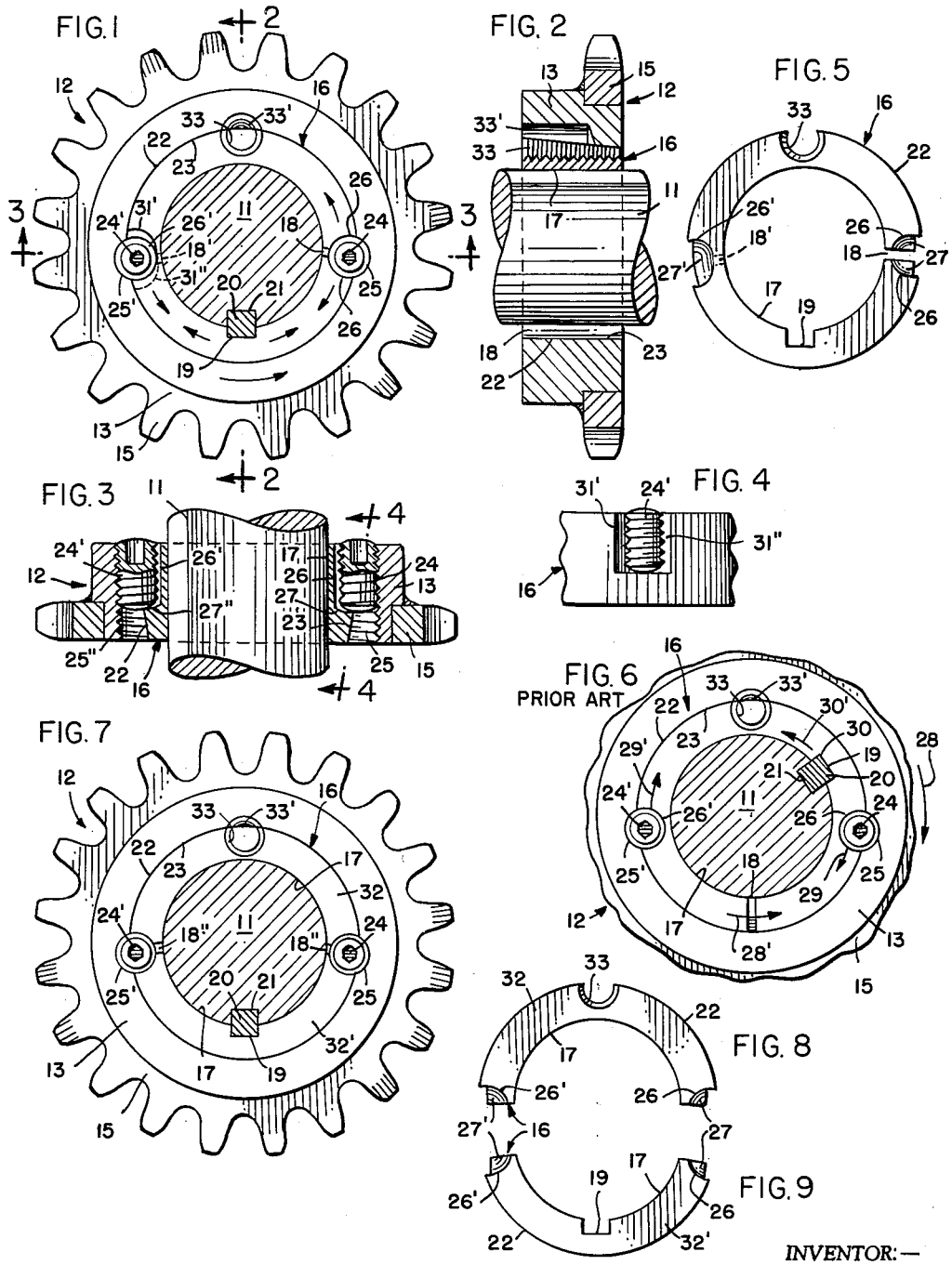
INVENTOR:—
DAVID FIRTH
BY:—
Marzall, Johnston, Cook & Root
ATT'YS

United States Patent Office

2,986,416
Patented May 30, 1961

2,986,416

SHAFT BUSHING

David Firth, South Bend, Ind., assignor to Dodge Manufacturing Corporation, Mishawaka, Ind., a corporation of Indiana Original application Sept. 23, 1953, Ser. No. 381,850, now Patent No. 2,856,211, dated Oct. 14, 1958. Divided and this application Feb. 4, 1958, Ser. No. 713,176

5 Claims. (Cl. 287—52.06)

The present invention relates in general to shaft bushings, and comprises subject matter divided from a copending application, Serial No. 381,850, filed September 23, 1953, now Patent No. 2,856,211, the invention having more particular reference to tapered bushings for the shaft mounting of sprockets, gears, pulleys and other wheel-like elements.

The invention more especially pertains to taper lock shaft bushings of the sort shown in United States Letters Patent No. 2,402,743, which issued June 25, 1946, on the invention of David Firth, and which discloses a split bushing adapted for snug slip fitted and keyed engagement upon a shaft, the outer surface of the bushing being tapered in an axial direction to weddingly fit within the correspondingly tapered hub of a wheel element to be mounted on the shaft, the structure including a pair of fastening screws threadingly engaged in half pockets formed in the tapered hub engaging surface of the bushing, on opposite sides thereof, the screws being also received in unthreaded cooperating half pockets formed, in the sleeve engaging surface of the hub, in registration with the threaded half pockets of the hub. The unthreaded half pockets are provided with bottoms for bearingly receiving the ends of said screws, whereby the same, when tightened in said threaded half pockets against said bearing bottoms of the unthreaded half pockets, may thrust the bushing axially with respect to the hub in a direction to weddingly secure the hub wheel element on the bushing and to clampingly engage the bushing with the shaft.

When the structure disclosed in the aforesaid Patent No. 2,402,743 is at rest, as initially assembled, all parts of the split bushing are apt to be under compression, since the fastening screws do not fit tightly in the pockets and the bushing, accordingly, is in frictional engagement only with the shaft and wheel. This condition may persist while the structure is driven in either direction, by force applied either to the shaft to drive the wheel element or to the wheel element to drive the shaft, until the transmitted driving torque exceeds the strength of the frictional driving engagement of the bushing with the shaft and wheel. When this occurs the bushing may slip and consequently turn angularly with respect to the shaft and wheel, and hence place the bushing sleeve under tension in the portions thereof which transmit the driving force, said force transmitting portions being those which extend between the driving key and the fastening screw which leads the key, when driving power is applied to the wheel, and the portions which extend between the driving key and the fastening screw which trails the key, when driving power is applied to the shaft. The sleeve bushing accordingly is likely to fracture in service at its point of minimum section within the portion thus placed in tension. This fracturing tendency is especially evident where the structure is employed for the transmission of driving power of non-uniform jerky character, as where the wheel element comprises a chain sprocket.

An important object of the present invention is to provide a construction of the character mentioned wherein the above noted tendency toward fracture is entirely eliminated in the sleeve bushing.

Another important object is to provide a structure of the character mentioned, including a sleeve bushing, wherein the parts are so formed and arranged that the driving force is applied through the sleeve bushing in manner placing the force transmitting portions thereof in compression, whereby to minimize the likelihood of fracture of the bushing in service.

The foregoing and numerous other important objects, advantages and inherent functions of the invention will become apparent as the same is more fully understood from the following description, which, taken in conjunction with the accompanying drawings, discloses preferred embodiments of the invention.

Referring to the drawings:

Fig. 1 is an end view of a shaft fitted with bushing mounted wheel means embodying the present invention;

Figs. 2 and 3 are sectional views respectively taken substantially along the lines 2—2 and 3—3 in Fig. 1;

Fig. 4 is a sectional view taken along the line 4—4 in Fig. 3;

Fig. 5 is a view of portions of the structure shown in Fig. 1;

Fig. 6 is a plan view of a bushing of the sort shown in Patent No. 2,402,743 for purposes of comparison.

Fig. 7 is a plan view of a modified wheel mounting bushing embodying the present invention; and Figs. 8 and 9 are views of portions of the bushing shown in Fig. 7.

To illustrate the invention, the drawings show a shaft 11, a power transmitting wheel element 12 having a hub 13 and a rim 15, and a sleeve bushing 16 of suitable material, such as cast iron, for drivingly connecting the wheel with the shaft. While the present invention is not necessarily restricted to the form, shape or configuration of the wheel element 12, but may have application to any type of shaft mounted wheel, including disk wheels, spoked wheels, gears, pulleys and rollers, the drawings show a wheel in which the peripheral portions 15 are formed to provide sprocket teeth whereby the wheel constitutes a sprocket for driving engagement, as with a suitable chain.

The bushing 16 is formed with inner cylindrical surfaces 17 sized to slidingly fit upon the shaft 11. The bushing 16 may also be split longitudinally, as at 18, whereby the bushing sleeve may be compressed inwardly into tight engagement with the shaft. The bushing may also be provided with a longitudinally extending key seat 19 for drivingly connecting the sleeve 16 with the shaft 11, as by means of a feather, key or spline 20 conventionally mounted in the groove 19 of the sleeve, and a key seat groove 21 formed in and longitudinally of the shaft.

The outer surfaces 22 of the bushing sleeve 16 are tapered in one direction to fit within the correspondingly tapered, inwardly facing surfaces 23 of the wheel hub 13, whereby the bushing sleeve may wedgingly extend within the hub 13 and around the shaft 11 to clampingly secure the wheel on the shaft. To this end, clamping screws 24, 24' may be provided for drawing the bushing sleeve 16 within the hub 13 in a direction to wedgingly secure the parts together. These clamping screws may be formed for threaded engagement in half pockets 25, 25' provided in the wheel hub 13, on opposite sides thereof, in position opening laterally inwardly of the tapered wheel hub surface 23, the opposite ends of said screw threaded half pockets also opening at the opposite end faces of the wheel hub. These threaded half pockets 25, 25' are adapted to register with complementary half pocket cavities 26 and 26' formed in the outer tapered surface 22 of the bushing sleeve 16, each of said half pocket cavities opening laterally outwardly of said tapered surface 23 and at one end at an end surface of the sleeve in which formed, the opposite end of each cavity forming an abutment seat 27, 27' for receiving the thrust of a clamping screw.

It should be understood that, as the fastening screws are tightened in the pockets, the bushing sleeve will be squeezed and so compressed between the wheel and shaft. The screws, also, are relatively loose in the unthreaded half pockets 26 and 26'. Accordingly, the driving connection is accomplished initially by the frictional engagement of the bushing sleeve with the shaft and wheel. Such frictional driving engagement, with all parts of the bushing in compression will persist, during operation of the structure for the transmission of power between shaft and wheel, until transmitted driving torque exceeds the strength of the frictional driving connection of the bushing with the wheel. When this takes place in the structure of U.S. Patent No. 2,402,743, here shown in Fig. 6, the bushing 16 will slip within the wheel to the extent permitted by any looseness or clearance which may exist between the screws 24 and 24' and their corresponding half pockets 26, 26'. As a result of such slippage, portions of the bushing sleeve will be caused to operate in tension, whether the shaft drives the wheel or vice versa and regardless of the rotary direction in which the parts move.

For example, if the wheel 13 be driven in a clockwise direction, viewing Fig. 6, as shown by the direction arrow 28, slippage of the bushing with respect to the wheel 13 will take place, as shown by the arrow 28', in a direction opposite to that in which the wheel 13 is driven. The bushing, however, may slip only enough to take up the radial clearance between the clamping screws and the leading sides of the bushing half pocket cavities 26, 26'. Under such conditions, the driven wheel 13 will apply thrust in the direction of the arrow 28 upon the clamping screws 24 and 24' in the half pockets 25 and 25'. The clamping screws, in turn, will apply thrust upon the bushing sleeve 16, in the same direction, as shown by arrows 29 and 29'. The reaction of the shaft 11 will, of course, represent a force acting in the rotary direction opposite to that in which the wheel 13 is driven, such force being applied to the bushing 16 at and by the trailing side 30 of the spline 20 in the direction indicated by the directional arrow 30'. Accordingly, it will be seen that the sleeve 16 will tend to be in compression, as indicated by the force indicating arrows 29' and 30', throughout the portions thereof which extend between the trailing side 30 of the spline 20 and the clamping screw 24'. The bushing portions of the sleeve 16, which extend between the trailing side 30 of the spline 20 and the leading side of the pocket 26 which contains the clamping screw 24, will be in tension, as shown by the force indicating arrows 29 and 30'.

Materials of which the bushing sleeve may be made are many times stronger in compression than in tension. The strength of cast iron, for example, is of the order of 80,000 pounds per square inch, in compression, as compared with strength of the order of 15,000 pounds per square inch, in tension. As a consequence, when the transmitted driving force exceeds the tensile strength of the material of the bushing sleeve, the same will fracture at its weakest section, in the zone that is loaded in tension, accordingly, when the wheel is driven in a clockwise direction, in the arrangement shown in Fig. 6, fracture of the bushing 16 is likely to occur at the key seat 19 or in the plane of minimum section at the cavity 26.

The same sort of tension loading and fracture likelihood will occur when the shaft 11 is driven in a clockwise direction, viewing Fig. 6.

If the wheel 13, in Fig. 6, be driven in a counter-clockwise direction, the bushing 16 will be placed under tension in the zone thereof which extends between the spline 20 and the clamping screw 24', whereby the bushing fracture will tend to occur at the weakest portion of said zone, as at the plane of minimum section at the cavity 26', or at the key seat 19. Similar tension loading and fracture likelihood will develop when the shaft 11 is driven clockwise viewing Fig. 6.

The present invention contemplates the alteration of the arrangement of United States Patent No. 2,402,743 in order that no portion of the bushing sleeve 16 will at any time be permitted to operate in tension when performing its driving function. To this end, as shown more particularly in Figs. 1 and 5 of the drawings, the objects of the present invention may be accomplished by forming the longitudinal split 18 through one of the half pocket cavities, such as the cavity 26, and by cutting away, beveling or relieving a side of the other cavity, such as the cavity 26', as at 31', so that driving force may not be applied by the clamping screw 24' upon the bushing 16, or vice versa, at the so relieved side of the cavity 26'. In order to eliminate the possibility of loading the bushing 16 in tension it is only necessary to relieve the cavity 26' on the side thereof which is remote or farthest away from the key slot 19, in the direction around the bushing from the key slot through the cavity 26' toward the cavity 26. The side of the cavity 26' which is nearest the key slot need not be relieved, although it may be if desired, as shown in dotted lines at 31" in Fig. 1. If desired, as indicated in dotted lines at 18', the bushing 16 may be partially severed by forming a slot in the thin wall section which extends between the cavity 26' and the inner shaft facing wall of the bushing.

Where a bushing of the sort shown in Figs. 1 and 5 is in use with a driven wheel, after slippage of the bushing, the load will be transmitted to the shaft only through the bushing portions which extend between the key slot 19 and the leading side of the split cavity 26, or the unrelieved side of the cavity 26' such portions being loaded in compression. The bushing portions which extend between the key slot and the trailing side of the split cavity 26 or the relieved side of the cavity 26' will not be dynamically loaded. On the other hand, when the shaft is driven, torque will be transmitted to the wheel only through the bushing portions which extend between the key slot and the trailing side of the split cavity 26, or the unrelieved side of the cavity 26' such portions being loaded in compression, the bushing portions which extend between the key slot and the leading side of the split cavity 26 or the relieved side of the cavity 26' being not dynamically loaded.

As shown in Figs. 7, 8 and 9 the objects of the present invention may also be accomplished without relieving or enlarging either of the cavities 26 or 26', but by longitudinally splitting the bushing sleeve, as at 18", at both of the cavities 26 and 26', thereby constituting the bushing 16 as a pair of separate, cooperating segments 32 and 32'. Where a split bushing of the sort shown in Fig. 7 is in use with a driven wheel, after slippage of the bushing parts, the load will be transmitted to the shaft only through the bushing segment which contains the key slot 19, and only through the portions of said segment which extend between the key slot and the clamp screw cavity which trails the key slot, such portions being loaded in compression. The segment portions which lead the key slot cannot be dynamically loaded. Where the shaft is driven, torque will be transmitted to the wheel only through the segment portions which lead the key slot, such portions being loaded in compression. The segment portions which lead the key slot, in the Fig. 10 embodiment, when the shaft is driven, cannot be dynamically loaded.

If desired, the wheel hub 13 and the bushing 16 may be formed with a pair of cooperating half pockets 33 and 33' opening upon the tapered surfaces 22 and 23. One of the half pockets, such as the half pocket 33, may be threaded to receive a releasing screw which may be identical to the clamping screws 24, 24', the cooperating half pocket, such as the half pocket 33', being formed with a bottom for engagement with the end of a releasing screw disposed in the cooperating half pockets 33 and 33', such half pocket bottom being comparable to the cavity bottoms 27, 27'. The arrangement of the cooperating half pockets 33 and 33' is such that upon tightening the releasing screw in the threads of one half pocket, the engagement of the screw with the bottom of the cooperating half pocket will draw that portion of the bushing 16 which contains the half pocket 33 axially outwardly from within the hub 13, to thereby disengage the bushing from within the hub after removal of the clamping screws 24 and 24'.

It is thought that the invention and its numerous attendant advantages will be fully undersood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A shaft mountable wheel having a hub formed with a tapered bore, a bushing correspondingly tapered for shaft clamping interfitment within said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within and clampingly squeezed upon a shaft by action of said clamping screws, said bushing being formed internally with a longitudinal groove for driving engagement with a shaft mounted key whereby driving force may be transmitted through said bushing between said key groove and the half pockets in said bushing, said bushing being longitudinally split through one of the half pockets therein, thereby constituting the same as a split half pocket, a side of the other of said bushing half pockets being relieved, thereby constituting the same as a relieved half pocket, said relieved half pocket being relieved upon the side thereof which is farthest away from the key slot, in the direction around the bushing from the key slot through the relieved half pocket toward the split half pocket, whereby to inhibit driving engagement of said relieved side with the clamping screw therein, to thereby prevent the application of driving force in said bushing in a direction placing the same in tension.

2. A shaft mountable wheel having a hub formed with a tapered bore, a bushing correspondingly tapered for shaft clamping interfitment within said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within and clampingly squeezed upon a shaft by action of said clamping screws, said bushing being formed internally with a longitudinal groove for driving engagement with a shaft mounted key whereby driving force may be transmitted through said bushing between said key groove and the half pockets in said bushing, said bushing being longitudinally split through one of the half pockets therein, and the opposite sides of the other of said bushing half pockets being relieved to prevent driving engagement of said relieved sides with respect to the clamping screw therein, to thereby prevent the application of driving force in said bushing in a direction placing the same in tension.

3. A shaft mountable wheel having a hub formed with a tapered bore, a bushing correspondingly tapered for shaft clamping interfitment within said tapered bore, said hub and bushing having registering half pocket pairs formed in the tapered surfaces of said hub and bushing, one half pocket of each pair being threaded for engagement with a clamping screw and the other half pocket of each pair being formed with a screw engaging bottom, and a clamping screw in each of a plurality of pairs of registering half pockets whereby the bushing may be drawn within and clampingly squeezed upon a shaft by action of said clamping screws, said bushing being formed internally with a longitudinal groove for driving engagement with a shaft mounted key whereby driving force may be transmitted through said bushing between said key groove and the half pockets in said bushing, said bushing being formed with longitudinal splits through the half pockets in said bushing to thereby divide the bushing as a pair of segments.

4. A bushing for the shaft mounting of a wheel having a hub forming a shaft opening, said bushing being longitudinally split to form a gap therein and being sized to encircle the shaft and to fit within the hub of the wheel, said bushing having an inwardly opening key slot in position to receive a shaft mounted spline, said bushing being also formed with a pair of axially extending circumferentially spaced and peripherally opening half pockets disposed in position to register with complementary half pockets in the wheel hub to form sockets for the mounting of holding and driving members therein, said gap intersecting a said half pocket in the bushing, thereby constituting the same as a split half pocket, a side of the other of said bushing half pockets being relieved, thereby constituting the same as a relieved half pocket, said relieved half pocket being relieved upon the side thereof which is farthest away from the key slot, in the direction around the bushing from the key slot through the relieved half pocket toward the split half pocket, whereby to prevent torque transmitting engagement of said relieved side with a said driving member disposed therein.

5. An annular bushing for the shaft mounting of a wheel having a hub forming a shaft opening, said bushing being sized to encircle the shaft and to fit within the hub of the wheel, said bushing having an inwardly opening key slot in position to receive a shaft mounted spline, said bushing being also formed with a pair of axially extending circumferentially spaced and peripherally opening bushing half pockets disposed in position to register with complementary hub half pockets in the wheel hub to form sockets for the mounting of holding and driving members therein, said bushing being longitudinally split through said bushing half pockets, whereby to form the bushing as a pair of arcuate segments each having a portion of both said half pockets at the opposite ends of said segments.

References Cited in the file of this patent

UNITED STATES PATENTS

| | | |
|---|---|---|
| 1,392,915 | Clendenon | Oct. 11, 1921 |
| 2,402,743 | Firth | June 25, 1946 |
| 2,509,711 | Wilhams | May 30, 1950 |
| 2,571,699 | Firth | Oct. 16, 1951 |